2 Sheets—Sheet 1.

M. McDONALD.
Fishway.

No. 208,408. Patented Sept. 24, 1878.

WITNESSES:
W. W. Hollingsworth
Edw. W. Byrn

INVENTOR:
Marshall McDonald
BY
ATTORNEYS.

2 Sheets—Sheet 2.

M. McDONALD.
Fishway.

No. 208,408.    Patented Sept. 24, 1878.

WITNESSES:
W. W. Hollingsworth
Edw. W. Byrn

INVENTOR:
Marshall McDonald
BY
ATTORNEYS.

UNITED STATES PATENT OFFICE.

MARSHALL McDONALD, OF LEXINGTON, VIRGINIA.

IMPROVEMENT IN FISHWAYS.

Specification forming part of Letters Patent No. 208,408, dated September 24, 1878; application filed July 29, 1878.

*To all whom it may concern:*

Be it known that I, MARSHALL MCDONALD, of Lexington, in the county of Rockbridge and State of Virginia, have invented a new and Improved Fishway; and I do hereby declare that the following is a full, clear, and exact description of the same, reference being had to the accompanying drawing, forming part of this specification, in which—

Figure 1:
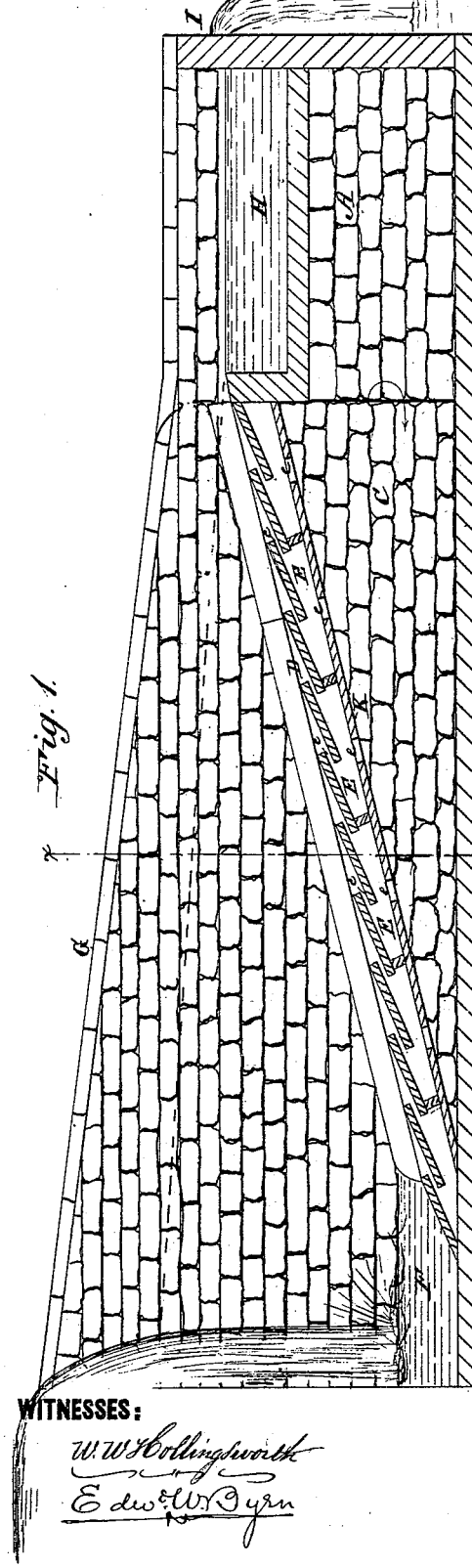
Figure 2:
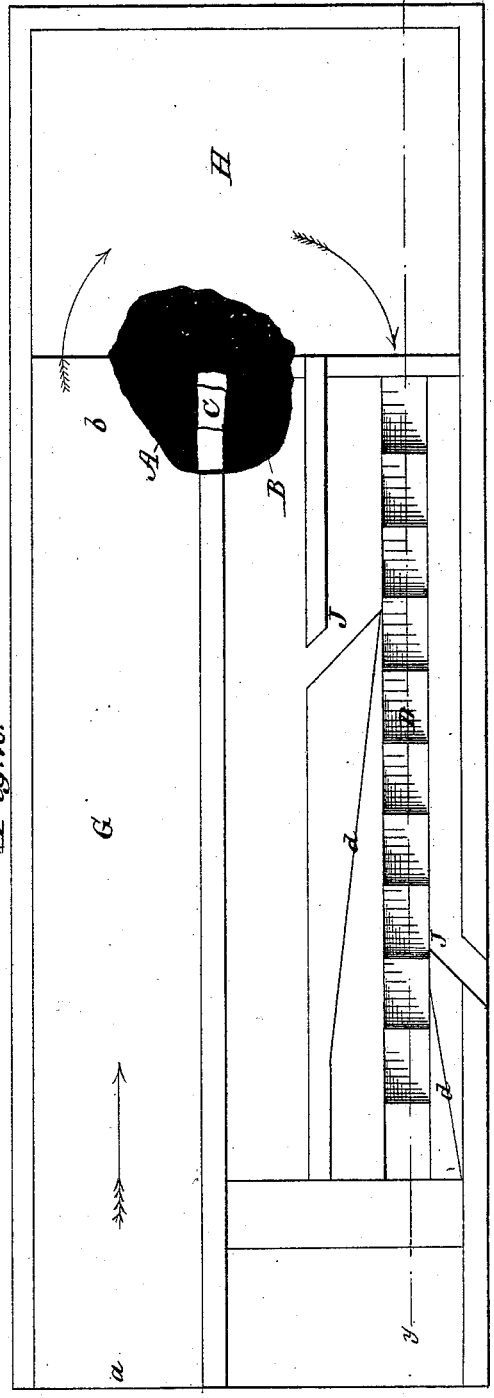
Figure 3:
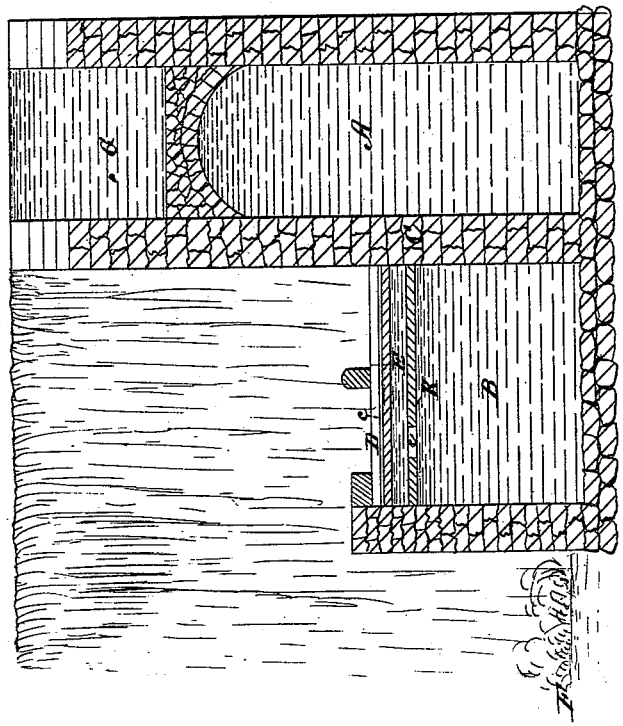

Figure 1 is a vertical longitudinal section of Fig. 2 through the line $y\,y$. Fig. 2 is a plan view, with a part broken away to show the end of the partition-wall. Fig. 3 is a vertical transverse section through the line $x\,x$, Fig. 1, looking from right to left.

My invention relates to a novel construction of fishway designed to permit the fish to pass up streams which are obstructed by dams, and to thus promote the propagation and culture of this source of food.

In the fishways heretofore in use the ascent of the dam by the fish has been provided for by reducing the velocity of the current flowing from the crest of the dam to the lower level, which is effected by a slight fall or incline and a tortuous channel. The volume of water in such cases, however, is not sufficient to attract the fish, and besides these structures are cumbersome, liable to be swept away by ice and floods, and involve an unnecessary and excessive expenditure for material, labor, and maintenance.

In accomplishing the desired result, my invention consists, mainly, in utilizing the head of water for the production, upon an incline, of an upwardly-moving current, the head of water being led to the under side of the incline, whence it issues through openings to the surface, which openings are arranged in series and direct the current upwardly, so that an incipient upward current is produced near the bed of the incline, which flows back at such a low velocity as to permit the fish to swim upward in the same, the natural instinct of the fish causing it to swim against the current.

The invention also consists in other details of construction and arrangement for adapting this principle to practice and perfecting the same, as hereinafter more fully described.

In the drawing, A represents a chamber, which, at the end $a$, opens into the upper level of the dam, and at the end $b$ opens into a chamber, B, beneath the incline, which chamber B is separated from A by a partition-wall, C. This incline is constructed with a bed-surface, D, having a series of flat discharge-openings, $e$, extending throughout its entire surface and directed upwardly. These openings communicate with corresponding chambers E, formed by a bottom, K, and these chambers communicate with the main chamber B, beneath the incline, which receives its water from A under a pressure equal to the head, so that throughout the entire surface of the incline D an incipient upward current is created, which gradually flows back upon itself to the lower level, F, of the dam.

Just above the chamber A is arranged a gradually-inclined sluice, G, which opens into the upper level at the crest of the dam, and leads a current of water with a slight fall to a landing-pool, H, from which a portion of the water escapes through a waste-gate, I, and a portion passes down the bed of the incline. The face or incline of the sluice, and hence the velocity of the current in the same, is regulated so as not to exceed a speed of three miles per hour, against which current any fish may ascend from the landing-pool to the dam.

When the fishway is in action the water escaping from the upwardly-directed vents of the incline is piled up on the central plane, and is shoved upward and outward, and finally descends by gravity along each side of the central plane. When these lateral currents have acquired by descent a velocity exceeding four or five miles an hour they are intercepted by the lateral chutes, J J, and are led off of the fishway proper; or if water be scarce, the water taken by these chutes is trapped and conducted to a lower point of the chamber beneath the slotted incline and again utilized by emerging through lower openings. In projecting the chutes J toward the central column of water the inclination of their sides $d$ is such as to guide the fish from side to side, keeping him sustained by the central volume of water. We have therefore on the incline a central column of water leading up to the landing-pool, and this water is ascending along the bottom and center. On either side of this ascending column is a neutral plane, while upon the extreme outside the currents descend; but as the velocity does not exceed five miles to the hour, and other conditions are favorable, the fish easily and readily ascend to the landing-pool above, whence they proceed up the gradual incline of the sluice to the higher level of the dam.

By means of the second bottom, K, to the incline forming the chambers E, an adjustable slide or cut-off, governing the size of the inlets e to said chambers, may be used to produce a constant pressure and uniform discharge at all of the discharge-outlets c, the inlets e at the top being correspondingly enlarged in proportion to the diminution of the head.

In modifying the arrangement of my device I may, when the dam is not very high, dispense entirely with the sluice G and chamber A, and simply arrange the high end of the incline at the crest of the dam, with the chamber B beneath the same communicating with the higher level, and the lower end of the incline remote from the dam.

In modifying the construction of the incline, also, it is not necessary for the efficient working of the way that the descending currents should be on each side of the central ascending volume, but may flow back over the top, in which case the fishway would be a simple trough or sluice with slotted bottom, the fish being opposed by more or less resistance in this case, according to the depth of his course, there being a medium plane of relative rest along which the fish could readily ascend.

In constructing the fishway the walls are preferably made of masonry and the incline of wood; but the entire way may be built of wood or any other suitable material, dependent upon the facilities of construction which circumstances or the locality may present. The form of the openings of the incline is not material, and the size, number, and direction will vary with the amount of water available and with the slope of the incline.

Having thus described my invention, what I claim as new is—

1. The method of utilizing the velocity of a head of water at the dam for the ascent of the fish, which consists in directing said head of water through a series of openings upon an incline discharging upwardly, substantially as and for the purpose described.

2. A fishway consisting, essentially, of an inclined bed or sluiceway having a subjacent chamber, B, adapted to receive water from the upper level of the dam, and discharge-openings upon its surface directed up the incline, substantially as and for the purpose described.

3. The combination, with the incline D, having upwardly-discharging openings, of the side chutes or traps, J, as and for the purpose described.

4. The combination, with the incline D, having upwardly-discharging openings, of the bottom K, provided with partitions forming chambers, and having inlets for rendering the discharge uniform through all the openings, as described.

5. The combination of the sluice G, the landing-pool H, and the incline D, having openings directed upwardly and communicating through a subjacent chamber with the upper end of the dam.

The above specification of my invention signed by me.

M. McDONALD.

Witnesses:
   EDWD. W. BYRN,
   SOLON C. KEMON.